United States Patent Office 3,082,336
Patented Mar. 19, 1963

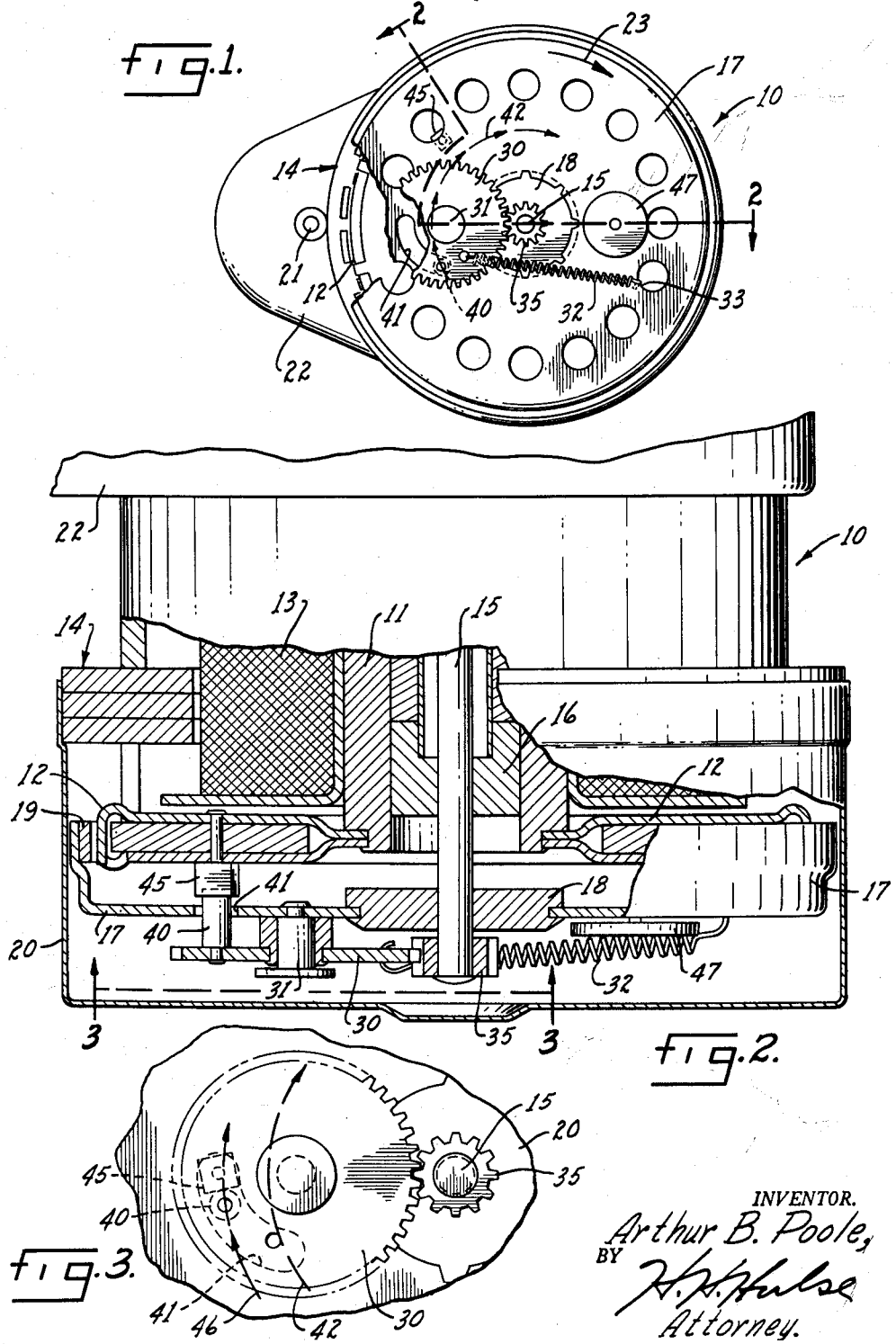
March 19, 1963 — A. B. POOLE — 3,082,336
TORQUE LIMITING DEVICE
Filed May 13, 1960
INVENTOR.
Arthur B. Poole,
BY H. H. Hulse
Attorney.

3,082,336
TORQUE LIMITING DEVICE
Arthur B. Poole, Harwinton, Conn., assignor to General Time Corporation, New York, N.Y., a corporation of Delaware
Filed May 13, 1960, Ser. No. 28,885
3 Claims. (Cl. 310—83)

The present invention relates to synchronous timing motors and concerns more particularly an arrangement for limiting the output torque of such motors.

Synchronous, shaded pole motors are widely used in clockwork or time controlled devices of many types to produce a constant speed source of rotative power. Most such motors utilize two pole constructions and are designed to be driven by 60 cycle alternating current so as to have a rotor speed of 3600 r.p.m. The rotor speed is then geared down to the output speed desired of the timing motor, and output speeds of one revolution per minute, one revolution per hour or even one revolution per twelve hours are common. Further speed reductions in the devices driven by the motor are also often provided.

Thus, even though such motors are usually physically small and generate little torque at their rotors, the subsequent gear reduction through which the power is directed permits substantial torque loads to be developed within the driven devices, as when inadvertent blockage of the driving train occurs. Moreover, devices with which synchronous timing motors are used are often rather delicate and are thus unable to handle high torque loads. Therefore, temporary misalinement or jamming of a timing motor driven device can easily create torque loads in the driving train which are sufficient to damage or permanently misaline the device.

In view of the foregoing problem, it is the general aim of the invention to provide a novel arrangement for imposing a positive upper limit on the output torque of a timing motor.

It is also an object of the invention to provide a novel torque limiting arrangement as referred to above that is unusually simple in design so as to be economical to construct and reliable in operation.

Moreover, it is a related object to provide a torque limiting arrangement as characterized above which may be embodied in a standard timing motor with little modification and with only a slight, if any, increase in the overall dimensions of the standard motor.

It is a further object to provide a torque limiting arrangement that can be easily adapted to function as a positive motor stop when any particular desired torque is reached, with the selected limiting torque being virtually any torque capable of being exerted by the motor.

Other objects and advantages of the invention will become apparent upon reading the attached detailed description and upon reference to the drawings in which:

FIGURE 1 is a plan of a standard timing motor having embodied therein the torque limiting device of the present invention and with the outer housing removed and portions broken away for greater clarity;

FIG. 2 is an enlarged fragmentary section taken approximately along the line 2—2 of FIG. 1 but with the parts in an alternate operating position; and FIG. 3 is a fragmentary plan taken approximately along the line 3—3 of FIG. 2.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to the drawings, there is shown a timing motor 10 in which is embodied a torque limiting device constructed in accordance with the invention. The motor 10 is a synchronous, shaded pole type of motor designed to provide a constant output speed when energized by alternating current having a controlled frequency cycle.

The motor 10 includes a magnetic field core 11 which carries stationary field structure 12 and an energizing field coil 13. Also forming a part of the field structure are shading or phase shifting members 14. An output shaft 15 passes through the core 11 rotatably supported by bearings 16, only one of which is shown.

A non-magnetic rotor disk 17 is secured to a hub 18 carried on the output shaft 15. The rotor 17 supports a rotor ring 19 formed of magnetic material which cooperates with the stationary field structure. A housing cup 20 is fitted snugly onto the shading members 14 so as to surround and protect the interior parts of the motor.

The motor output shaft 15 is coupled to a driving shaft 21 (see FIG. 1) through speed reduction gears located in a gear case 22. When the coil 13 is energized from a source of alternating current, the rotor 17 is driven in a clockwise direction as indicated by the arrow 23.

As thus far described, it can be seen that the motor 10 corresponds to a conventional timing motor such as that shown in the U.S. patent to Schellens No. 2,334,040, issued November 9, 1943.

In accordance with the invention, the rotor 17 is freely journaled on the output shaft 15 and is rotatably coupled thereto by a biased member 30 arranged so as to drive the shaft until excessive torque on the shaft causes movement of the member against its bias to positively block further rotor rotation. In this way, the output torque exerted by the motor can never exceed, and is limited by, the biasing force applied to the member 30.

In the preferred embodiment, the biased member is a gear wheel 30 journaled on the rotor 17 by a stud 31. The gear wheel 30 is biased by a spring 32, extending between the gear wheel and an anchor point 33 on the rotor, in a counterclockwise direction which is the angular direction opposite to that in which the rotor 17 is driven.

To obtain driving engagement between the gear wheel 30 and the output shaft 15, a pinion 35 is secured to the end of the output shaft in meshing engagement with the gear wheel 30. In operation, the rotor 17 is driven in a clockwise direction carrying the gear wheel 30 also in a clockwise direction about the output shaft 15. The meshing engagement between the gear wheel 30 and the pinion 35 causes the output shaft to rotate with the rotor 17, the gear wheel being held against rotation about its pivot stud 31 by the spring 32. Upon blocking of the output shaft 15 against further rotation, it can be seen that the gear wheel 30 is carried by the rotor 17 about the then stationary pinion 35 so that the wheel 30 acts much as a planet gear rotating about a sun gear. This causes the gear wheel 30 to rotate about its pivot pin 31 against the force exerted by the biasing spring 32.

In order to block rotation of the rotor 17 when the desired torque limit on the output shaft 15 is exceeded, the gear wheel 30 carries a stop element or pin 40 which, in the illustrated embodiment, extends through an arcuate slot 41 formed in the adjacent rotor 17. In normal operation, the spring 32 swings the gear wheel 30 counterclockwise until the pin 40 engages one end of the slot 41 and thus the pin 40 establishes the fixed normal position of the gear wheel. When the gear wheel is in its normal position and the output shaft 15 is rotating freely, the pin 40 moves through a normal circular path indicated by the arrows 42.

Cooperating with the stop pin 40 is a blocking element 45 located out of the normal path of the stop pin. In the illustrated form of the device the blocking element 45 is secured to the field structure 12 of the motor.

It can now be seen that in normal operation the spring 32 will hold the gear wheel 30 in its normal position with the pin 40 abutting one end of the arcuate slot 41. As the rotor 17 is driven, the gear wheel 30 will be carried about the pinion 35 so as to rotate the pinion and drive the output shaft 15.

If resistance to movement of the output shaft 15 increases, that is if the torque load on the motor 10 steadily increases, the biasing force of the spring 32 holding the gear wheel 30 in its normal position will gradually be overcome until the gear wheel begins to rotate about its pivot stud 31 relative to the pinion 35. When the torque load on the output shaft 15 becomes sufficiently great to overcome the force of the spring 32, the gear wheel 30 will be rotated so as to swing the stop pin 40 from its normal path 42 outwardly into a path 46 (see FIG. 3) which brings the stop pin 40, as the rotor 17 continues to rotate, into abutting contact with the blocking element 45. Engagement between the pin 40 and the element 45 positively locks the rotor 17 against further rotation and thus the motor ceases to function until the resistance blocking rotation of the output shaft 15 is removed so as to allow the spring 32 to withdraw the pin 40 from the element 45 by rotating the gear wheel 30 in a counterclockwise direction. Normal operation of the motor can then be resumed so long as the torque load on the output shaft 15 does not exceed the positive limitation imposed by the spring 32.

In the preferred embodiment, the rotor 17 is kept in balance by securing a counterweight 47 to the rotor in a position axially opposite the gear wheel 30.

Those skilled in the art will appreciate that the device described above is quite simple and hence economical to construct. It will be observed that little modification of a standard timing motor is required and that the overall dimensions of the motor are not substantially affected.

The torque limit at which blocking of the rotor 17 occurs is determined of course by the biasing force exerted by the spring 32 and therefore by simply selecting an appropriate spring any desired torque limit can be provided.

I claim as my invention:

1. In a synchronous timing motor having an output shaft and a rotor, a torque limiting arrangement comprising, in combination, a pinion secured to said output shaft adjacent said rotor, said rotor being journaled for free rotation on said shaft, a gear wheel journaled on said rotor, said gear wheel being in meshing engagement with said pinion, means biasing said gear wheel in one angular direction so that the rotor, when driven in the opposite angular direction, imposes an output torque on said shaft, a stop element carried by said gear wheel, and means located out of the normal path of said stop element for engaging said element to block rotation of said rotor when the gear wheel is rotated against its bias so as to carry said stop element out of its normal path.

2. In a synchronous timing motor having an output shaft and a rotor, a torque limiting arrangement comprising, in combination, a rotatable member journaled on said rotor, said rotor being journaled for free rotation on said shaft, said rotatable member being in driving engagement with said shaft, means biasing said member in one angular direction so that the rotor, when driven in the opposite angular direction imposes an output torque on said shaft, a stop element carried by said member, and means located out of the normal path of said stop element for engaging said element to block rotation of said rotor when the member is rotated against its bias so as to carry said stop element out of its normal path.

3. In a synchronous timing motor having an output shaft and a rotor, a torque limiting arrangement comprising, in combination, a pinion secured to said output shaft adjacent said rotor, said rotor being journaled for free rotation on said shaft, a gear wheel journaled on said rotor, said gear wheel being in meshing engagement with said pinion, a spring anchored on said rotor and coupled to said gear wheel for biasing said gear wheel in one angular direction so that the rotor, when driven in the opposite angular direction, imposes an output torque on said shaft, a stop pin carried by said gear wheel, means on said rotor providing a counterweight to said gear wheel and spring, and means located out of the normal path of said stop pin for engaging said pin to block rotation of said rotor when the gear wheel is rotated against its bias so as to carry said stop pin out of its normal path.

References Cited in the file of this patent

UNITED STATES PATENTS

| | | |
|---|---|---|
| 2,082,506 | Murphy | June 1, 1937 |
| 2,482,032 | Schweitzer | Sept. 13, 1949 |
| 2,702,353 | Herson et al. | Feb. 15, 1955 |